United States Patent [19]

Alafandi et al.

[11] 4,100,108

[45] Jul. 11, 1978

[54] ZEOLITIC CATALYSTS AND METHOD OF PRODUCING SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 782,971

[22] Filed: Mar. 30, 1977

Related U.S. Application Data

[63] Continuation-in-part of Ser. No. 718,166, Aug. 27, 1976, and a continuation-in-part of Ser. No. 718,167, Sep. 9, 1976, Pat. No. 4,058,484.

[51] Int. Cl.² .................... B01J 29/06; C10G 11/02
[52] U.S. Cl. ................... 252/455 Z; 208/120

[58] Field of Search .................... 252/455 Z

[56] References Cited

U.S. PATENT DOCUMENTS

| 3,366,578 | 1/1968 | Michalko | 252/455 Z |
|---|---|---|---|
| 3,640,905 | 2/1972 | Wilson, Jr. | 252/455 Z |
| 3,686,121 | 8/1972 | Kimberlin, Jr. et al. | 252/455 Z |

*Primary Examiner*—Carl F. Dees
*Attorney, Agent, or Firm*—Subkow and Kriegel

[57] ABSTRACT

This invention relates to production of improved zeolitic catalysts produced from mixtures of cation exchanged zeolites of the faujasite type incorporated into a matrix such as alumina, silica-alumina gels and clay or mixtures thereof.

11 Claims, 1 Drawing Figure

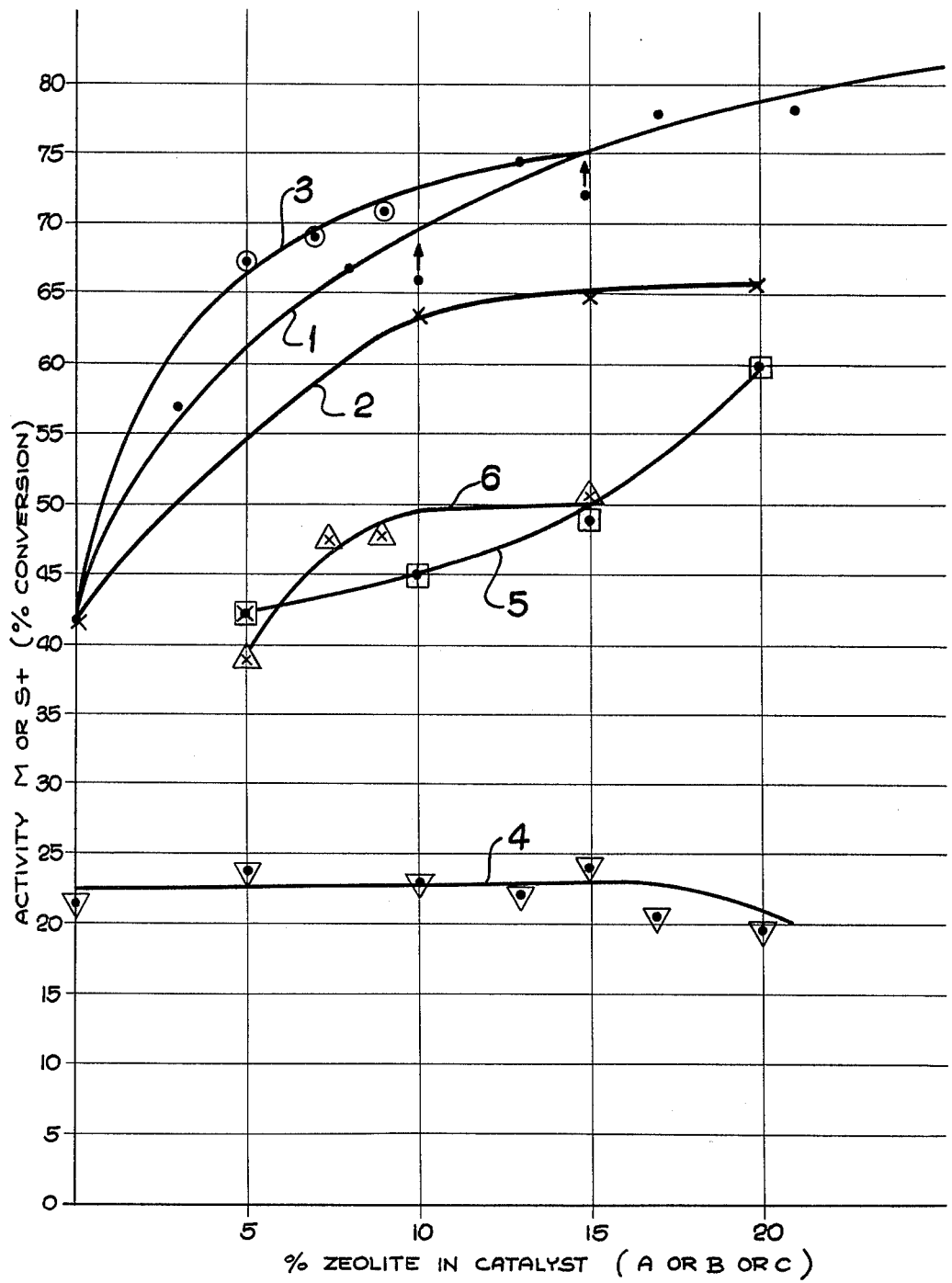

ZEOLITIC CATALYSTS AND METHOD OF PRODUCING SAME

This application is a continuation-in-part of applications Ser. Nos. 718,166 filed Aug. 27, 1976 and 718,167 filed Sept. 9, 1976 now U.S. Pat. No. 4,058,484.

BACKGROUND OF THE INVENTION

The prior art catalysts of this class are classified into stable and ultra-stable types for purposes of distinguishing these catalysts. These prior art catalysts have been formed from faujasite type zeolites, for example, the Y type zeolite (see Breck U.S. Pat. No. 3,130,007), and from X type zeolites (U.S. Pat. No. 2,882,244) by exchange, for example, with H, $NH_4$, rare earths, and alkaline earth cations or mixtures thereof by ordinary exchange at ambient temperatures. The degree of exchange may be sufficient to reduce the Na content of the zeolite, expressed as $Na_2O$ to about 3 to 4%. The compounded catalyst has a $Na_2O$ content of about 1%. The S+ activity, (see further below) of catalysts formed by incorporating the same in a matrix, for example, such as hydrated alumina and clay is in the order of 20%. Matrixes employed in the prior art have included silica gels. Such prior art zeolites are here referred to as Class B zeolites and the catalyst produced as Class B catalysts.

The S+ activity is not materially improved by reducing the $Na_2O$ content of the zeolite by multiple exchanges down to about 1.75 to about 2%. The low S+ activity is indicative of a zeolite which is to a considerable degree hydrothermally unstable. The exposure of the catalyst, formulated from the zeolite, to steam at 1550° F for 2 hours, referred to as S+ activity has substantially deactivated the catalyst to give the low S+ activity.

While the activity after steaming at the higher temperature of 1550° F is an important characteristic of catalyst of high stability, the activity after a lower temperature steaming at 1450° referred to as M activity is also an important parameter.

The Class B catalysts have, characteristically, M activities in the range of about 60 to about 70 depending on its chemical constitution and concentration of the zeolite in the matrix. The M and S activity were measured by the improved microactivity test described in Oil and Gas Journal issues of 1966, Volume 64, No. 39, pp. 7, 84, and 85, and of Nov. 22, 1971, pp. 60–68.

The prior art has found that by exchanging the zeolite to partially reduce the sodium content of the zeolite and then heating the zeolite by calcining in the presence or absence of steam, the sodium content of the zeolite may be reduced to less than 1% by weight. Such processes are disclosed as U.S. Pat. Nos. 3,293,192, 3,402,996, 3,867,277, 3,281,199, and 3,692,692. Catalysts formed from these zeolites by incorporating the same in a matrix will have an S+ activity in the range of about 45%.

Applicants have discovered an improved method of reducing the sodium content of faujasite type zeolites. The zeolites thus formed have $Na_2O$ values of from about 2.5 to about 0.5% and catalyst formulated therefrom employing the above matrix have S+ activities in the range of 50 to 60%. (See application Ser. No. 718,167.)

All such zeolites are here termed Class A zeolites and the catalyst formed therefrom as Class A catalysts. They are characterized as of substantially greater hydrothermal stability as represented by its substantially higher S+ activity. M activity of the A type catalysts is in the range of about 40% to about 60% depending on the concentration of the zeolite in the catalysts.

The sodium content of both Class A and Class B catalysts, based on the total catalyst weight on a volatile free basis is below about 1%.

STATEMENT OF THE INVENTION

The zeolites of Class A and Class B may be produced from clay as described in U.S. Pat. No. 3,446,727 or produced as described in the above U.S. Pat. No. 3,130,007 or 2,882,244 and exchanged with H or $NH_4$ cations or polyvalent cations such as rare earth or alkaline earth cations thereof as is well known in this art. An improved method of producing the Class A zeolites is by the procedure described in our copending parent application referred to above. The zeolites are mixed with a matrix such as has been used in the prior art, for example, hydrated alumina, clay, silica gel, or as we have found with silica-alumina gel as described in our copending application, Ser. No. 769,118 filed Feb. 16, 1977.

All of the aforesaid applications are mentioned herein by the above references.

We have found that a mixture of the type B zeolite and the more stable type A zeolite when incorporated into a matrix (here referred to as type C catalysts) will produce a catalyst of S+ activity and also M activity which is higher than could be expected from the separate activities of the separate component zeolites. Instead of each zeolite component adding its proportionate activities based on its part in the mixture and its separate activity, the activity of the mixture is substantially higher. By using in the catalyst a concentration of both the A and B zeolites substantially less than when they are used separately to produce desireable microactivities, a substantial simplification in processing and a saving in costs may be obtained in producing catalysts employing type A zeolites in combining a type A and a type B zeolite in a type C catalyst.

This is an entirely unexpected result and permits an unexpected improvement of the catalytic activity of catalysts produced from Class B zeolites. There appears to be a synergistic relation of the Class A zeolite and the Class B zeolite.

It is, therefore, an object of our invention to improve the activity of cracking catalyst by mixing an exchanged zeolite of relatively low hydrothermal stability, as measured by its S+ activity, with an exchanged zeolite of high hydrothermal stability as measured by its S+ activity, in a matrix to obtain a catalyst of relatively high M and S+ activity.

We propose to formulate a catalyst containing mixture of exchanged zeolites to one of said zeolites being of the A type and having sodium content, expressed as $Na_2O$ less than about 2.5% down to about 0.5% and the other being a zeolite of the B type containing sodium more than about 2.5 to 5% expressed as $Na_2O$, which catalyst is composed of admixture of the aforesaid components and a matrix and which catalyst has a Na content in the range of about 0.1 to about 1.5% expressed as $Na_2O$ on a volatile free basis.

The remaining cation content of the zeolites may be those chosen from the group consisting of monovalent cations, H and $NH_4$ and polyvalent cations such as alkaline earth cations, for example calcium and magnesium and rare earth cations such as lanthanum and other cations of the rare earth group.

Desirable ratios of the A zeolites to the B zeolite, on a volatile free basis are in the range of from about 1 part of A to about 4 parts of B up to about 4 parts of A to about 1 part of B zeolite. That is the concentration of B in the mixture of A and B and may range from about 20% to about 80% by weight of B in the mixture of the zeolites.

The following examples are illustrative of our invention.

In all of the following examples:

The Y zeolite, the hydrated alumina and the clay employed in the compositions of the following examples all have been used in prior art commercial catalysts or have been fully described in patents or are the subject matter of copending applications referred to above.

The following Example 1 illustrates a catalyst of the B type incorporating zeolite of the B type.

EXAMPLE 1

A slurry of a sodium Y type zeolite $p_H$ of 12.5 and containing about 25% solids is acidified with sulfuric acid to a $P_H$ of 3.5. The slurry is filtered, and the filter cake is slurried to a solid content of about 25%. The resultant slurry is reacted with rare earth sulfate solution as described in U.S. Pat. No. 3,446,727, however without introducing other metallic cations, to form an exchanged zeolite of about 10–15% by weight of rare earth ions expressed as rare earth oxides based upon the zeolite content on a volatile-free basis. The slurry is filtered and washed substantially sulfate free. The filter cake had the following composition.

Na$_2$O: 4.5% by weight
ReO: 12.0% by weight
Al$_2$O$_3$: 26.0% by weight
Remainder silica (SiO$_2$)

ReO comprises about 60% La$_2$O$_3$ and about 40% CeO$_2$ by weight

The matrix was produced as follows. A hundred grams of hydrated alumina, (pseudoboehmite) was peptized with 1.057 liters of water per hundred grams of the alumina to which had been added 9.5 ml of 100% formic acid per 1.057 liters with moderate stirring for about 30 minutes. To this mixture was added 309.5 grams of ball clay, per 100 grams of alumina on a volatile-free basis and 100 grams of acid-treated halloysite per 100 grams of the alumina referred to above, and the mixture was vigorously stirred for about 15 minutes. To the resultant mixture was added the exchanged B zeolite produced as above in the following proportions, with vigorous agitation. The mixture was spray dried at an inlet temperature of the flame of about 870° F. The outlet temperature of the combustion gases from the spray drier was 330° F. The air nozzle of the spray drier was at 25 psig pressure. The spray-drier feed was introduced at 21 psig pressure. The finished spray-dried catalyst, was collected as particles of 70 micron average diameter.

Several samples of the catalyst was prepared as in the Example 1 with various concentrations of the class B zeolite formed as above.

Sample 1 was prepared as above but omitting the zeolite.

Sample 2 was prepared by adding an amount of the zeolite to give a catalyst with 5% of the zeolite based on the catalyst on a volatile free basis.

Sample 3 contained 10% instead of 5%.
Sample 4 contained 13% instead of 5%.
Sample 5 contained 15% instead of 5%.
Sample 6 contained 17% instead of 5%.
Sample 7 contained 21% instead of 5%.

The adjustment was made by reducing the percentage of the ball clay to make up the 100% of catalyst as shown in the following Table 1.

TABLE 1

| | SAMPLE | | | | | | |
|---|---|---|---|---|---|---|---|
| | 1 | 2 | 3 | 4 | 5 | 6 | 7 |
| Composition, Wt % | | | | | | | |
| Class B Zeolite | 0 | 5 | 10 | 13 | 15 | 17 | 21 |
| Alumina | 18 | 18 | 18 | 18 | 18 | 18 | 18 |
| Ball Clay | 66 | 61 | 56 | 53 | 51 | 49 | 45 |
| Acid Treated Halloysite | 16 | 16 | 16 | 16 | 16 | 16 | 16 |
| Catalytic Properties | | | | | | | |
| M ACTIVITY Conv. vol.% | 40.1 | 56.7 | 65.9 | 74.1 | 72.2 | 78.2 | 77.7 |
| S+ ACTIVITY Conv. vol.% | 21.6 | 24.8 | 22.9 | 21.9 | 23.8 | 20.4 | 19.5 |

The following Example 2 illustrates a class A catalyst produced from an (NH$_4$) exchanged class A zeolite.

EXAMPLE 2

NaY (4.8–5 SiO$_2$/Al$_2$O$_3$) ratio was exchanged twice with (NH$_4$)$_2$ SO$_4$ solution at 180°–200° for 12 hours — using in each exchange 100% by weight of (NH$_4$)$_2$ SO$_4$ based on the volatile free weight of the zeolite in a slurry containing 10% of the zeolite.

The mixture is filtered and washed.

The filter cake was dried at 250° F for 4 hours, then calcined at 1000° F for 2 hours.

The calcined material was exchanged with (NH$_4$)$_2$SO$_4$, using 65% by weight of the salt based on the volatile free weight of the zeolite at boiling temperatures for 6 hours.

The slurry is filtered and washed sulfate free.

The cake is dried at 250° F for 4 hours. The cake analyzed as follows:

% Na$_2$O = 0.17
% NH$_3$ = 5.27
% Al$_2$O$_3$ = 17.6
% SiO$_2$ = 55.2

The filter cake prior to drying was dispersed in the slurry of the matrix as in Example 1.

The slurry of the exchanged zeolite produced as above was added in various amounts, adjusting the ball day clay content as in Example 1 to give catalysts as follows:

Sample 8 was produced by including 5% of the class A zeolite of Example 2 in the catalyst.
Sample 9 by including 10% of the class A zeolite.
Sample 10 by including 15% of the class A zeolite.
Sample 11 by including 20% of the zeolite.

The composition and M and S+ activity is given in Table 2.

TABLE 2

| | Composition % | | | | | |
|---|---|---|---|---|---|---|
| | Zeolite | | | Acid Treated | Activity | |
| Sample | % (A) | Al$_2$O$_3$ | Ball Clay | Halloysite | M | S+ |
| 8 | 5 | 18 | 61 | 16 | 42 | 42 |
| 9 | 10 | 18 | 56 | 16 | 64 | 45 |
| 10 | 15 | 18 | 51 | 16 | 65 | 49 |
| 11 | 20 | 18 | 46 | 16 | 66 | 60 |

EXAMPLE 3

A series of catalysts was formulated as in Example 1 but using a mixture of a slurry of the washed type B zeolite filter cake of Example 1 and the washed type A zeolite filter cake of Example 2 which is type A.

The slurries were mixed in the ratios stated below and added to the slurry of the matrix as in Example 1 and processed as in Example 1.

The total zeolite component in the catalyst was 15% by weight on a volatile free basis and the alumina was 18% and the remainder 51% ball clay and 16% acid treated halloysite all on a volatile free basis.

The following Table 3 gives the M and S+ activity of the type C catalyst produced from the mixed zeolites.

TABLE 3

| Sample | Zeolite % | | | Activity | |
|---|---|---|---|---|---|
| | A | B | Total | M | S+ |
| 12 | 9 | 6 | 15 | 71 | 48 |
| 13 | 8 | 7 | 15 | 69 | 48 |
| 14 | 5 | 10 | 15 | 67 | 39 |
| 15 | 15 | — | 15 | 65 | 49 |
| 5 | — | 15 | 15 | 72.2 | 23.8 |

The class A zeolite of Example 4 is an ammonium and rare earth exchanged zeolite formulated into class A catalyst.

EXAMPLE 4

The filter cake of Example 1 which had been washed substantially free of sulfate ions and dried. It was calcined at 1000° F for 2 hours and exchanged with an aqueous solution of ammonium sulfate using ammonium sulfate equal to 4 equivalent of sulfate ($NH_4$) + per equivalent of sodium and an amount of water to form a slurry equivalent to a 10% solids. The calcined zeolite was added in solid form to the ammonium salt solution at a constant pH = 3.5-3.6, adjusted by addition of sulfuric acid. Time of exchange is 2 hours with fast agitation after pH stabilization at 3.5 value. Temperature of exchange as at ambient.

The exchanged zeolite was filtered and washed with deionized water, sulfate ion free. Three hot washes was employed, using 10 parts of water to one part of cake on a volatile free basis for each wash.

The product analyzed as follows:
The following is a typical analysis of the product.

Chemical Analysis 1.1% $Na_2O$
10.1% ReO (rare earth oxides)
2.3% $NH_3$
Nil% $SO_3$ The catalyst of this example was formulated from an exchanged zeolite according to the procedure of Example 1 employing various percentages of the zeolite and adjusting the percent of Ball Clay as in the previous Example 2. (See Below)

EXAMPLE 5

The class A zeolite of Example 5 is an ammonium and rare earth exchanged zeolite of substantially lower $Na_2O$ content than that of Example 4 formulated into a class A catalyst. The zeolite exchanged under pressure at 300° F employing the NaY used in Examples 2 and 4. The exchange was employing $(NH_4)_2SO_4$, 40 equivalents of $(NH_4)_2SO_4$ per equivalent of Na in the zeolite.

The procedure is more fully described in our copending parent applications to which reference may be made. The exchanged zeolite solution containing 6% by weight of ReO on the volatile free weight of the ammonia exchanged zeolite was diluted with water sufficiently to make the zeolite slurry containing 10% of the zeolite.

The rare earth exchange was made at ambient temperature at a constant pH of about 5.5 to 5.6 by addition of $NH_4OH$.

The slurry is filtered and washed $SO_4$ free with deionized water.

A portion of the cake was dried at 250° F for 3 hours. It analyses
% $Na_2O$ = 0.43-0.34
% $NH_3$ = 5.73
% ReO = 4.35

The washed filtered cake was combined with the matrix and processed into a catalyst as in Example 1.

EXAMPLE 6

Several samples were formed as in Example 2 using various proportions of the A zeolite of Example 4 and the B zeolite of Example 1 and adjusting the percentage of the Ball Clay as in Example 2, to give a class C catalyst containing 9% of A and 6% of B.

The following Table 4 states the catalyst activity of the various sample:

TABLE 4

| Sample | Zeolite % | | | Activity | |
|---|---|---|---|---|---|
| | A | B | Total | M | S+ |
| 19 | 9 | 6 | 15 | 77 | 48 |
| 20 | 15 | — | 15 | 74 | 54 |
| 5 | | 15 | 6 | 72.2 | 23.8 |

EXAMPLE 5

Catalysts produced as in Example 3 and 6 but using the A zeolite of Example 5 and the B zeolite of Example 1 using 9% of the A zeolite and 6% of the B zeolite. Table 5 gives the activity of the catalysts.

TABLE 5

| Sample | Zeolite % | | | Activity | |
|---|---|---|---|---|---|
| | A | B | Total | M | S+ |
| 16 | 9 | 6 | 15 | 77 | 31 |
| 18 | 15 | — | 15 | 76 | 46 |
| 5 | | 15 | 15 | 73.2 | 23.8 |

As appears from FIG. 1 and Table 2, the M values of the Type C catalyst is higher than that of the Type A catalyst at zeolite concentrations equal to the total zeolite concentration of the mixed zeolites.

The above date shows that a mixture of an ammonium exchanged class A zeolite and a class B zeolite when formulated into a catalyst by combining the mixture of the zeolites with a matrix gives a catalyst having an M activity substantially higher than the M activity of either component when they are separately formulated into a matrix employing the concentrations of the component present in the mixture (See FIG. 1).

A like phenomenon is present when the catalyst is tested for its S+ activity.

The S+ activity of the Type C catalyst may be not substantially less than that of the Type A catalyst whose zeolite concentration is substantially equal to the total zeolite concentration of the Type C catalyst (See Table 1, 2 and 3 and FIG. 1).

The activity of the catalyst is substantially greater than the sum of the contributions of the class A and class B zeolite acting independently in a like matrix at like concentrations in the matrix.

There appears to be a synergistic effect when a class A and a class B zeolite act as a combination in a catalyst.

Reference to FIG. 1 illustrates the synergistic effect of the combination of the ammonium exchanged zeolite (Samples 1–18) A and B zeolites to form the class C zeolite. For a total of 15% of zeolite in the catalyst, the substitution of type A catalyst by the less stable B type catalyst instead of depreciating the activity of the catalyst actually improves the activity of the catalyst.

Curve 1 plots the M activity of the catalyst formed from the B type zeolite as shown in Table 1.

As appears the matrix (0% zeolite) has an M value of 40.1 and a value of 77.7% at 21% of the B zeolite.

Curve 2 plots the M value of the A zeolite from the value of the matrix (0% zeolite) for various concentrations of A zeolite up to 20% of the A zeolites as is given on Table 2.

Curve 3 plots the values shown on Table 3 for various concentrations of A zeolites in the mixture of A plus B zeolite for all finite concentrations of zeolites up to 15% total for both zeolites.

The comparison of Curve 3 with Curves 1 and 2 shows that for all finite values of the concentration less than 15% of A zeolite in the mixture of zeolites, the M value of the catalyst is greater than that of the catalyst containing the zeolite A alone or a catalyst containing zeolite B alone of like A or B concentration.

The improvement in the M value of the catalyst may be about 10 to 15 percentage points by including B zeolite.

The increase in the S+ value is particularly surprising in view of the low values of the B catalysts whose S+ activity is not substantially greater than that of the matrix.

Curve 4 plots the S+ activity of the matrix and of the B type catalyst as shown in Table 1.

Curve 5 plots the S+ activity of the A catalyst of Table 2.

Curve 6 plots the S+ activity of the C catalyst according to Table 3.

It will seen that for all finite values of the concentration of A zeolite less than 15% in the C catalyst, the S+ activity of the C catalyst is significantly greater than the A catalyst of like zeolite A concentration. This not withstanding the diluting effect of the B zeolite under S+ steaming conditions (See Curve 4).

Thus for example:

(a) 5% of A zeolite and 10% of B zeolite results a catalyst of M activity superior to a class A catalyst and the type B zeolite of percentage upward from less than 5%. Compare curve 3 with curves 1 and 2.

(b) The addition of Type B zeolite to replace a portion of Type A zeolite will improve the S+ activity of the class A catalyst. Thus the addition of upward from about 5% of the Type B zeolite to replace Type A zeolite will appreciate the S+ activity the A catalyst. Compare curves 4, 5 and 6.

We have thus discovered that we may obtain both an economic as well as a functional advantage by using a mixture of Type A zeolite and Type B zeolite to produce a Type C catalyst.

We therefore propose that to produce Type C catalyst containing about 15 to about 25% by weight of a mixture of Type A and Type B zeolite in a matrix, based on the total Type C catalyst on a volatile free basis and in which the concentration of type B zeolite in the mixture of type A and type B zeolite is from about 20% to about 80% by weight of the B zeolite in the mixture of A and B zeolite taken as 100%. The incorporation of the zeolites into the catalyst is prepared by combining the zeolites in a slurry form with the matrix and spray drying them as is conventional for the preparation of prior art fluid type catalysts as described above.

The type B and type A zeolites are employed in minor amounts, the total concentration of the mixed zeolites in the class C catalyst, on a volatile free basis, ranging from about 5% to about 25% by weight based upon the C catalyst on a volatile free basis with about 15% to about 20% being the usual and preferred concentrations. The preferred matrix is a mixture of ball clay and hydrated alumina with the alumina in the range of about 15 to about 25% of the catalyst on a volatile free basis. These concentration figures are not critical and depend upon the matrix and the concentration of zeolites. The desired M values range about 65% and better and desired S+ values are in excess of about 45%.

The preferred zeolites either of the B type or the A type are those in which part of the sodium in the zeolite has been exchanged with rare earth cations or with acid and rare earth cations or with ammonium or ammonium and rare earth cations as illustrated above, to reduce the sodium content in the case of the class B zeolites to a value of about 3% to 5% and in the class A zeolites to a value of about 2.5% to about 0.5% based upon the zeolite on a volatile free basis.

We claim:

1. A catalytic composition of matter comprising: a mixture of a zeolite of the faujasite type having a sodium content, expressed as $Na_2O$ from about 2.5% to about 5% and a zeolite of the faujasite type having a sodium content of less than about 2.5% and less than said first named zeolite, the weight ratio of the first named zeolite to the second named zeolite being in the range of from about 1. part by weight of the first named zeolite to 4 parts by weight of the second named zeolite to 4 part by weight of first named zeolite to 1. part by weight of the second named zeolite, said mixture being combined with a matrix and the combination having a sodium content expressed as $Na_2O$ of about 0.1 to about 1.5% on a volatile free basis.

2. The composition of claim 1 said zeolites containing cations chosen from the group consisting of hydrogen, ammonium, alkaline earth and rare earth cations and mixtures thereof.

3. The composition of claim 1 in which the concentration of the mixture of zeolites in the composition is in the range of about 5% to about 25% based upon a composition on a volatile free basis.

4. The composition of claim 2 in which the concentration of the mixture of zeolites in the composition is in the range of about 5% to about 25% based on the composition on a volatile free basis.

5. The catalyst of claim 1 in which the second named zeolite and the first named zeolite are both Y zeolites.

6. The cracking catalyst of claim 5 said zeolites containing cations chosen from the group consisting of hydrogen, ammonium, alkaline earth and rare earth cations and mixtures thereof.

7. The catalyst of claim 5 in which the concentration of the mixture of zeolites in the catalyst is in the range of about 5% to about 25% based on the catalyst on a volatile free basis.

8. The composition of claim 6 in which the concentration of the mixture of zeolites in the catalyst is in the range of about 5% to about 25% based on the composition on a volatile free basis.

9. The method of forming a catalytic composition of matter comprising: mixing a matrix with a zeolite of the faujasite type, having a sodium content, expressed as $Na_2O$ of more than about 2.5% with zeolite of the faujesite type having a sodium content of less than about 2.5% and less than said first named zeolite, the weight ratio of the first named zeolite to the second named zeolite being in the range of from about 1. part by weight of the second named zeolite to 4 parts by weight of the first named zeolite to 4 parts by weight of the second named zeolite to 1 part by weight of the first named zeolite drying said mixture to produce a catalyst having a sodium content expressed as $Na_2O$ of about 0.1 to about 1.5% all on a volatile free basis.

10. The process of claim 9 in which the said zeolites contain cations chosen from the group consisting of hydrogen, ammonium, alkaline earth and rare earth cations.

11. The process of claim 10 in which they spray dried material contains Na in the range of about 0.1 to about 1.5% expressed as $Na_2O$ of the catalyst on a volatile free basis.

* * * * *